No. 892,787. PATENTED JULY 7, 1908.
J. H. WIESE & W. SCHNECKLOTH.
CLEVIS.
APPLICATION FILED JUNE 22, 1907.
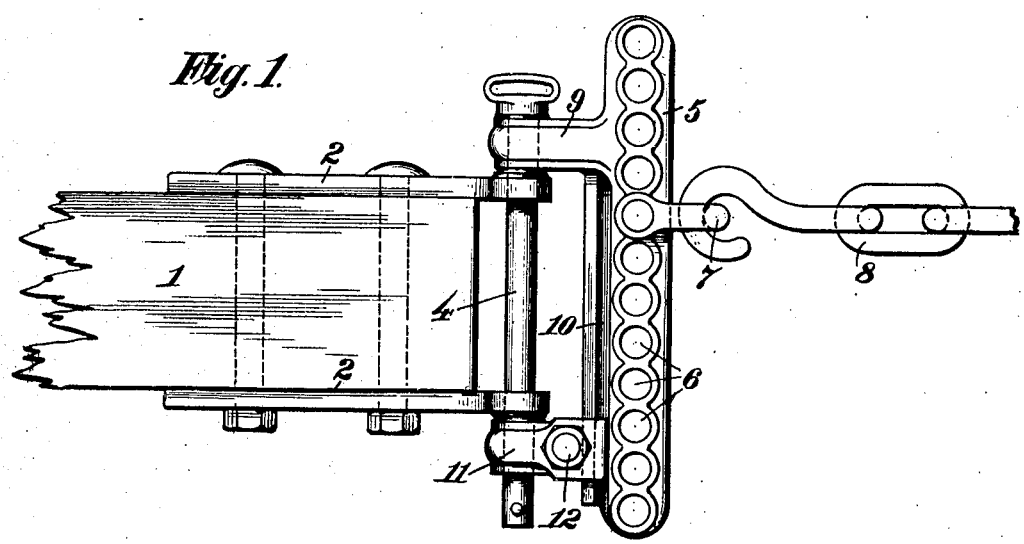
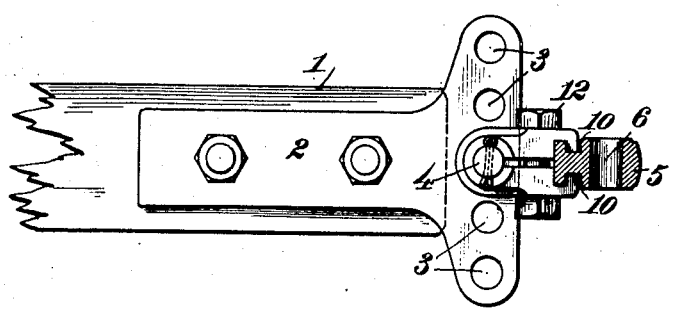
Witnesses:
Inventors:
James H. Wiese
and William Schneckloth
by Joshua R. H. Potts
Atty.

UNITED STATES PATENT OFFICE.

JAMES H. WIESE AND WILLIAM SCHNECKLOTH, OF CHICAGO, ILLINOIS.

CLEVIS.

No. 892,787.  Specification of Letters Patent.  Patented July 7, 1908.

Application filed June 22, 1907. Serial No. 380,299.

*To all whom it may concern:*

Be it known that we, JAMES H. WIESE and WILLIAM SCHNECKLOTH, residing at 7731 Green street, in the city of Chicago and county of Cook and State of Illinois, have invented certain new and useful Improvements in Clevises, of which the following is a specification.

Our invention relates to clevises for agricultural implements, such as plows, cultivators and the like.

The object of our invention is to provide a clevis as mentioned which may be readily and quickly adjusted to fit the draft-beam; and to provide an adjustable clevis, in which the adjustable parts will not interfere in the least with the adjustment of the shackle and draft chain thereon.

A further object is to provide an adjustable clevis, in which the adjustable member shall be rigidly fixed to the rest of the device when in use, to the end that it shall take up its share of all lateral strain.

With these objects in view our invention consists in the novel clevis shown in the drawings forming a part of this specification, and in which, Figure 1, is a plan view of a clevis embodying our invention and Fig. 2, is a side view thereof, a portion of the transverse bar being shown in section.

Referring to the drawings, 1, indicates a draft-beam to which is secured the metal jaws, 2. The jaws, 2, are provided with a series of holes, 3, to receive a pin, 4, by means of which the clevis is secured to the beam at different heights.

The clevis comprises a horizontal bar arranged transversely in front of the jaws, 2, and provided with a row of holes, 6, into any one of which the shackle, 7, may be fastened to adjustably connect the draft chain, 8, to the clevis. Extending inwardly from the bar, 5, is a lug, 9. This is formed integrally with the bar near one end thereof, and is provided with a hole to receive the pin, 4. The rear edge of the bar, 5, from the lug, 9 to the opposite end is grooved as at, 10, forming ways upon which is slidably arranged a block or adjustable lug, 11. The lug, 11 is provided with a hole to receive the pin, 4, and the jaws of the draft-beam are held between said lug and the lug, 9. It is evident that the clevis may be adjusted to exactly fit any width of the beam. It is desirable to have the lug, 11, rigidly fixed to the bar, 5, in order to take up its share of all lateral strain. Otherwise the lug, 9 would have to stand the whole of such strain, and consequently would be easily broken off. To this end we provide the lug with the bolt, 12, by which it is clamped rigidly to the ways, 10. The lug is split as shown, and when the bolt is loosened it springs open so as to move freely on the ways, and to release the pin, 4. However, when the bolt, 12 is tightened the lug is rigidly fixed to the bar, 5 and the pin is clamped therein at the same time.

Having described our invention, what we claim as new and desire to secure by Letters Patent is, In a clevis, a horizontal bar having a plurality of holes for attachment to the draft chain, in combination with a stationary lug on the rear edge of said bar, the rear edge of said bar being grooved from said lug to the opposite end forming ways, a split lug arranged entirely behind the holes in said bar and adapted to slide on said ways, said lugs having transverse holes in alinement with each other, a pin arranged in said holes and adapted to pass through the jaws of a draft beam, and a bolt extending through said split lug and adapted to clamp the same upon both the pin and said ways to form a rigid device, substantially as described.

In testimony whereof we have signed our names to this specification in the presence of two subscribing witnesses.

JAMES H. WIESE.
WILLIAM SCHNECKLOTH.

Witnesses:
F. E. SHEEHY,
HELEN F. LILLIS.